United States Patent [19]

Shurtliff

[11] Patent Number: 4,553,333

[45] Date of Patent: Nov. 19, 1985

[54] SYSTEM FOR PRODUCING PRECISION MEASUREMENTS OF WING RIBS

[76] Inventor: Jeffrey L. Shurtliff, 1669 N. 2800 W., Clinton, Utah 84015

[21] Appl. No.: 640,637

[22] Filed: Aug. 14, 1984

[51] Int. Cl.[4] .................................................. G01B 5/14
[52] U.S. Cl. .................................... 33/180 R; 33/158; 33/416
[58] Field of Search ................. 33/174 G, 180 R, 158, 33/161, 147 T, 143 E, 180 AT, 194, 415, 416

[56] References Cited

U.S. PATENT DOCUMENTS

| | | | |
|---|---|---|---|
| 1,142,717 | 6/1915 | Leathers | 33/143 R |
| 1,161,765 | 11/1915 | Dunbar | 33/3 R |
| 1,583,585 | 5/1926 | Emery | 33/143 R |
| 2,952,076 | 9/1960 | Gross | 33/165 |
| 3,354,552 | 11/1967 | Frei | 33/164 |

Primary Examiner—Willis Little
Attorney, Agent, or Firm—Donald J. Singer; Jacob N. Erlich

[57] ABSTRACT

A system for producing precise angular measurements in order to accurately configure an object, such as a wing rib, to be fit within a cavity, such as a wing. This system includes a device for measuring the interior angular measurements of the sides of the cavity and a device for measuring the exterior angular measurements of the sides of the object to be fit therein. Once these angular measurements are made, the exterior angle measuring device is made to encompass the interior angle measuring device. Any difference in space therebetween is related to the difference in angular size between the sides of the object and the cavity into which it is fit. Appropriate size adjustment of the object can then be readily made.

16 Claims, 3 Drawing Figures

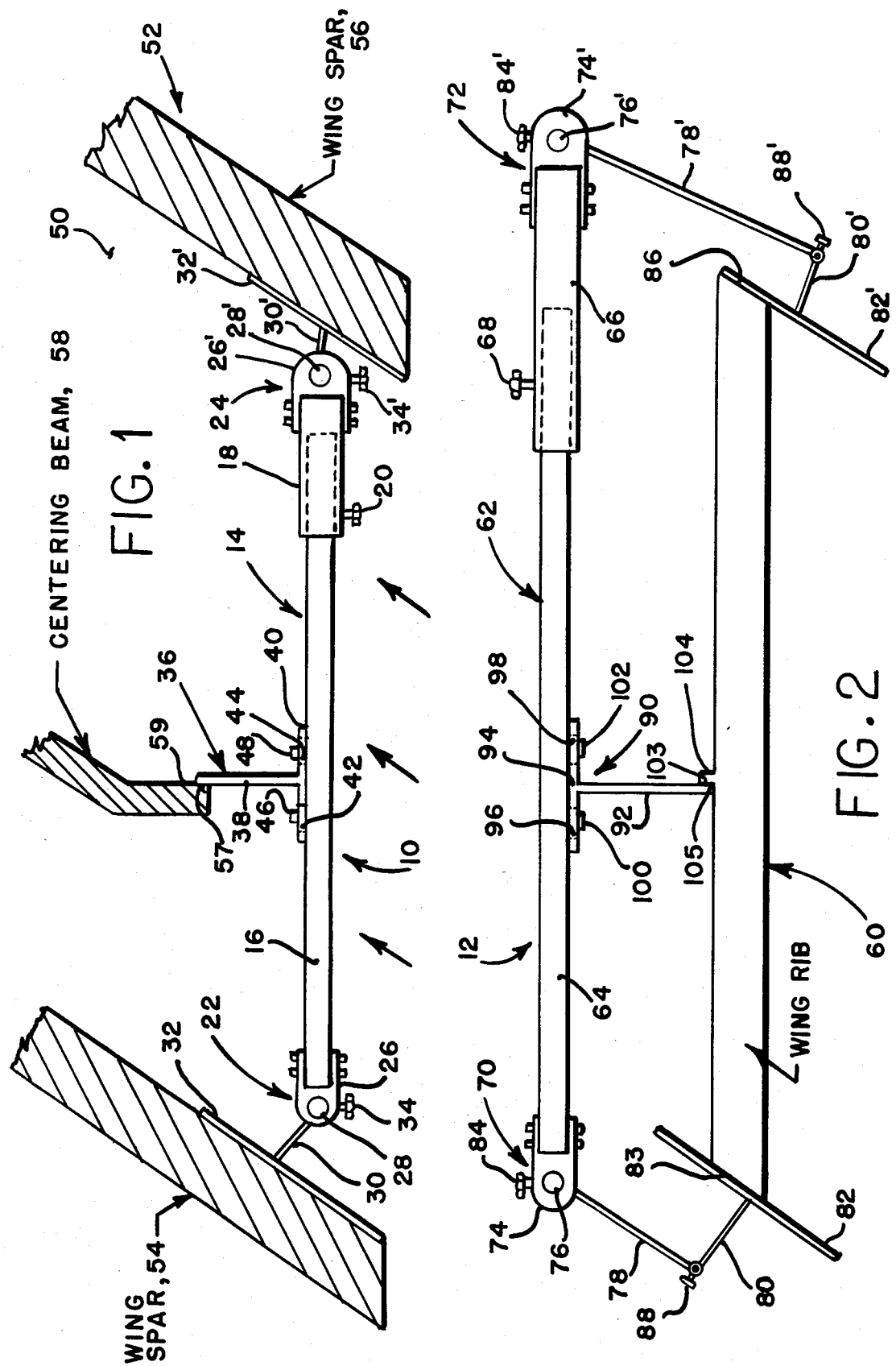

SYSTEM FOR PRODUCING PRECISION MEASUREMENTS OF WING RIBS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a system for providing precise angular measurements, and, more particularly, to a system which is capable of quickly and effectively providing the precise angular measurements necessary for the accurate production of wing ribs.

It is has long been recognized that it is diffuclt to quickly and accurately ascertain the exact interior angles located within structures having cavities or being hollow. Unfortunately, there are many instances wherein such exact measurements are extremely essential, for example, when taking measurements of the interior cavities of wings of aircraft or hulls of ships. To date, taking such precise measurements requires the utilization of complex and highly costly measurement devices and/or related measuring techniques. One example of such a complex measuring technique includes the utilization of computerized simulation in which such measurements, after lengthy calculations, can be compiled by the use of computers.

A particular instance in which interior cavity measurements are of utmost criticality can be found during the production of wing ribs for installation within aircraft, as for example, the F-4 aircraft. Critical measurements of such interior angles in aircraft wings are extremely important since in many instances it is the interior cavity of such wings which are utilized for fuel storage. If the wing ribs located therein are improperly fit then, in many instances, fuel leakage will occur. Another somewhat related problem with respect to improperly sized ribs relates to wing-lockdown. Although the problem of improper locking down is quite readily spotted and corrected prior to the aircraft leaving the assembly line, the problem mentioned hereinabove, that is, dealing with fuel leaks is substantially more serious.

The improper fitting of wing ribs leads to a fuel leakage problem which is extremely dangerous, yet virtually impossible to detect during the assembly of such aircraft. In fact, in most instances such fuel leaks associated with improper wing rib fit are not found until the aircraft has left the assembly line and is undergoing a testing procedure or in some instances, has already been delivered to the customer for actual usage. Once such a fuel leak arises, however, not only does such fuel leak create an extremely dangerous fire hazard but also the repair of fuel leaks is extremely time consuming and costly.

As mentioned above the techniques in use to date in matching wing ribs to the interior cavity configurations of wings incorporate the use of computer analysis, a procedure which may add weeks to the actual construction of the aircraft. Further, as pointed out hereinabobve, it should be realized that although the construction of wing ribs is one area in which interior angular measurements is a critical consideration, there are many other such examples wherein the utilization of a device capable of accurately and quickly ascertaining interior angular measurements would be especially useful.

SUMMARY OF THE INVENTION

The present invention overcomes the problems encountered in the past by providing not only a pair of novel measuring devices, but also an overall system which utilizes these devices in conjunction with each other in order to aid in the production of accurately machined components for insertion within cavities such as within the interior of wings. In particular, this invention is directed to the production of wing ribs which are to be inserted within the wing cavities of the F-4 aircraft, although such a limitation of the present invention is not to be construed as limiting the present invention to only one use. The concepts of this invention can be extended to any instance in which precise interior angular measurements is a consideration.

The system of the present invention incorporates the utilization of two angle measuring devices. One such device is utilized to measure the interior angles within a cavity such as a wing. The other device is utilized to measure the exterior angles of a component to be fit within the cavity such as a wing rib. Their use in combination greatly aids in the production of an accurate component for utilization within the cavity. An example of one such use of the present invention would be in the production of a wing rib for utilization within the cavity of a wing for the F-4 aircraft.

The device which measures the interior angles of a cavity, hereinafter referred to as the interior angle measuring device, is made up of an elongated support bar or rod formed of two sections. One section is hollow and receives a portion of the other section therein for adjustable mating therebetween. First and second adjustable feet are located at the end of each section, respectively. In addition, a centering device is adjustably mounted on the longer of the two sections.

More specifically, the elongated support bar has one section thereof made up of a solid box-like element and the other section thereof made up of a hollow box-like tubing into which the first section is insertable. A pair of gimbal supports at each end of the support bar adjustably mount the feet thereon so that the feet can easily be moved to a variety of different angular positions with respect to the support bar and can therefore accommodate a wide variety of interior angular configurations.

Use of the interior angle measuring device takes place by inserting, such as by sliding, the device into the cavity to a positon in which the centering device abuts one side of a centering beam found, for example, in the interior of a wing. Thereupon the pair of tubular sections are adjusted in length and the feet are adjusted so that they coincide with the angles to be measured. With the device in position and the feet in direct contact with the sides or walls of the cavity whose angles to be measured, the adjustable elements are locked in place so as to prevent movement thereof. Thereafter, the interior measuring device is slid from the cavity of the wing, for example, and is ready for use with the exterior angle measuring device in the system of this invention.

The other device of the present invention is utilized in measuring the external angles of a component, for example, the wing rib itself, to be placed within the cavity, and will be hereinafter referred to as the exterior angle measuring device. The exterior angular measuring device is substantially the same as the interior angle measuring device except that the feet of such a device are formed of two elements pivotally connected together. One such element being attached to the gimbal or adjustable mounting means within the support bar and the other element being attached to the first element. In this manner the support bar, together with the feet, can encompass the external surface of the component or wing rib to be measured. By such a construction of the exterior angle measuring device, the feet can be placed juxtaposed the exterior angles of, for example, the wing rib and locked in place. With the exterior angle measuring device, the centering element is positioned adjacent the centering surface of the component such as the wing rib.

Once both measuring devices are locked in place and are representative of the interior and exterior angles, respectively, the measuring devices are mated together with one centering device adjacent the other so as to duplicate the relationship between the cavity and the component to be fit therein.

Stated more succinctly, in the system embodied by the present invention once the two measurements are made, that is, the interior angle measuring device is set for its representation of the interior angles of the cavity and the exterior angle measuring device is set for the exterior angles of the component to fit within the cavity, the two devices are placed together in overlapping fashion such that the feet of the interior angle measuring device is adjacent the feet of the exterior angle measuring device. If there is a space between the feet of adjacent angle measuring devices it is that distance or space which represents an excess material on the component to be fit within the cavity. It is that amount of material which must be taken off the component, such as the wing rib, so as to provide for a proper fit between component and cavity, or more specifically, between wing rib and wing. In this manner it is easy to provide for accurately sized components to fit within such internal cavities. More particularly, this is of utmost importance in the production of wing ribs to be fit within the internal cavity of wings of, for example, the F-4 aircraft.

As pointed out hereinabove, such wing interior measurements and fits were previously performed by use of computer generated data since no other devices could make these measurements accurately enough to prevent fuel leakage. Unfortunately, such type of computer generated data in many instances required over a week to get back to the machine shop for appropriate use in producing wing ribs. The present invention is capable of producing accurate measurements within a half hour and in many instances, produce such measurements with far more accuracy than those determined by use of computer generated information. It is therefore an object of this invention to provide a system capable of producing accurately designed components to fit within internal cavities. It is another object of this invention to provide an interior angle measuring device. It is a further object of this inventon to provide an exterior angle measuring device.

It is still another object of this invention to provide a system which incorporates the use of both an internal or interior measuring device and an external or exterior measuring device in order to produce an accurately designed component for fitting within a preselected cavity.

It is still a further object of this invention to provide accurately designed wing ribs for the F-4 aircraft.

It is an even further object of this invention to provide angle measuring devices which are economical to produce and which utilize conventional, currently available components that lend themselves to standard mass producing manufacturing techniques.

For a better understanding of the present invention, together with other and further objects thereof, reference is made to the following description taken in conjunction with the accompanying drawings and its scope will be pointed out in appended claims.

BRIEF DESCRIPTION OF THE DRAWINGS

FIG. 1 is a top view of the interior angle measuring device of the present invention inserted within the interior cavity of a wing with the wing spars and centering beam illustrated in cross section;

FIG. 2 is a top view of the exterior angle measuring device of the present invention shown encompassing a wing rib to be fit within the interior cavity of the wing illustrated in FIG. 1.

DETAILED DESCRIPTION OF THE PREFERRED EMBODIMENTS

Figure 3:
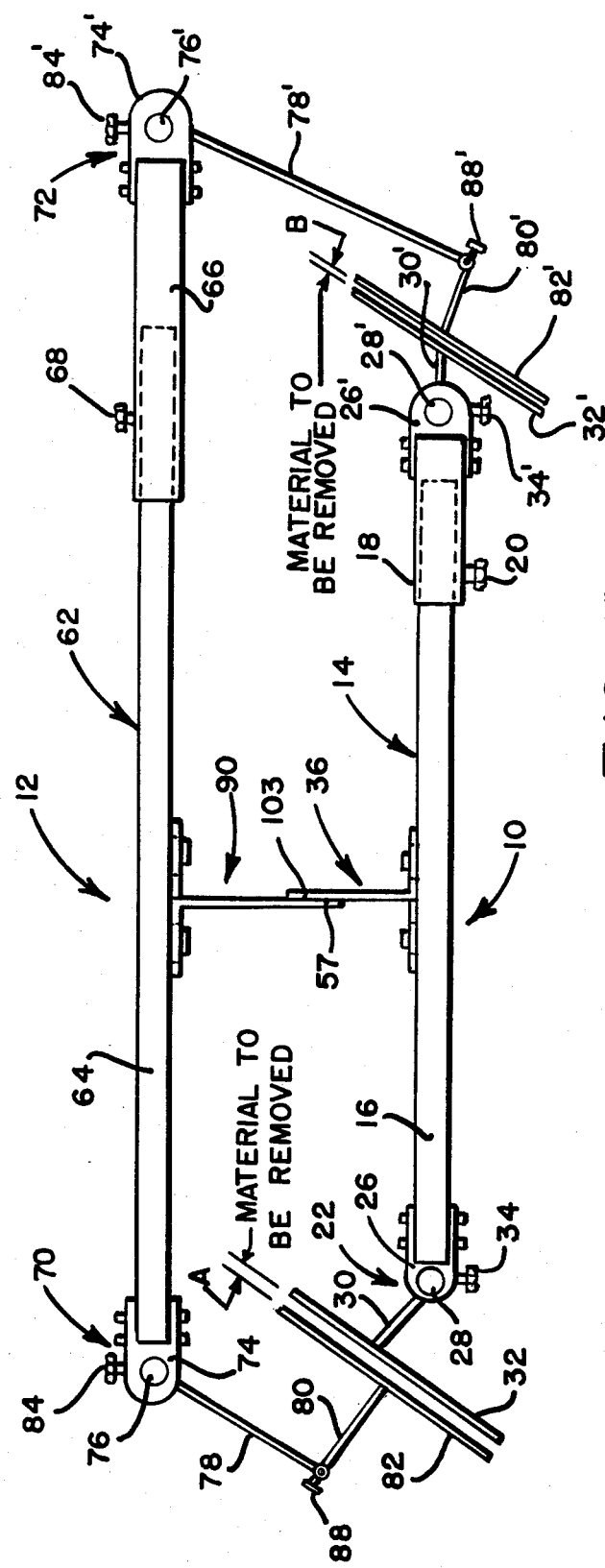
FIG. 3 is a top view illustrating the mating arrangement between the interior angle measuring device and the exterior angle measuring device of the present invention when utilized in a system for determining the amount of excess material to be removed from a component to be fit within the measured cavity.

The system of the present invention for producing precision measurements of wing ribs incorporates therein the utilization of two major components; an interior angle measuring device 10 and an exterior angle measuring device 12 both of which are clearly illustrated in a top view in FIGS. 1 and 2 of the drawings, respectively.

Reference is first made to FIG. 1 of the drawings for a detailed description of the interior angle measuring device 10 of the present invention. The interior angle measuring device 10 is made up of a support bar or rod 14 made up of two sections 16 and 18, one of which being insertable within the other for adjustable mounting therebetween. More specifically, section 16 is made of a solid box-like element which is insertable within section 18 in the form of a hollow box-like tubular element. Sections 16 and 18 are fixedly secured together by means of a fastening element 20 which forms part of the tubular element or section 18. As a result, sections 16 and 18 may be adjusted to a variety of different lengths in a manner to be described hereinbelow.

At each end of support bar 14 and connected to sections 16 and 18, respectively, is an angle measuring assembly 22 and 24. The design of assemblies 22 and 24 are substantially identical in configuration. Therefore, for ease of understanding of the present invention only one such assembly 22 will be described in detail. Assembly 22 is made up of a fixture 26 which is fixedly secured at the end of section 16. Within fixture 26 is a conventional gimbal mounting arrangement 28 to which is attached by means of an elongated element 30 a foot or foot-like plate 32. This foot-like plate 32 upon proper adjustment by means of gimbal arrangement 28 can matingly engage with the angular walls of a cavity in which such angular measurements are to be made, more particularly, the interior of a wing of an aircraft. A locking nut 34 is operably connected to gimbal mounting arrangement 28 and is utilized to fixedly secure foot-like plate 32 in its appropriate angular position.

As stated hereinabove assembly 24 is substantially identical to assembly 22 and also includes a fixture 26' a conventional gimbal arrangement 28' as well as a element 30' and foot-like plate 32'. In both instances locking nut 34 and 34', respectively, are utilized to fixedly secure the gimbal arrangements 28 and 28' in their preselected position once the foot-like plates 32 and 32' matingly engage the angular configured walls of the interior of a wing as illustrated in FIG. 1 of the drawings.

In addition, the interior angle measuring device 10 of the present invention also includes a centering device 36 which is of a T-shaped configuration having an elongated centrally upstanding element 38 situated substantially centrally of a base 40. Within base 40 are a pair of slots 42 and 44 through which securing nuts 46 and 48 can be inserted so as to adjustably mount and secure the centering device 36 upon section 16 of support bar 14.

As illustrated in FIG. 1 of the drawings, the interior angle measuring device 10 is inserted within the cavity 50 of, for example, a wing 52 made up of spars 54 and 56 as well as a centering beam 58. Although the present invention finds its main utility when utilized in measuring the interior angular configurations of wing 52 of, per example, an F-4 aircraft, it should be realized that it adaptable to a wide variety of different interior cavity configurations.

With the present invention the interior angle measuring device 10 is slid in the direction of the arrows into the interior cavity 50 of wing 52 until the interior edge 57 of centering device 36 abuts one side 59 of centering beam 58. In the position as shown in FIG. 1 of the drawings, the support bar 14 has its sections extended accordingly and the feet or foot-like plates 32 and 32' are then positioned so as to matingly engage the interior surfaces of spars 54 and 56, respectively. In the appropriate position, as shown in FIG. 1, once the interior angle measuring device 10 has been slidably inserted within cavity 50 of aircraft wing 52 in the direction of arrows and the appropriate locking nuts 20, 34 and 34' have been tightened as well as the adjustable centering bracket 36 being secured in position by nuts 44 and 46 the interior measuring device 10 can then be withdrawn. Interior angle measuring device 10 will therefore be representative of or act as a duplicate of a wing rib which is to be secured within cavity 50 of wing 52.

Continuing with the description of the present invention, reference is now made to FIG. 2 of the drawings wherein the exterior angle measuring device 12 is illustrated in top view. Angle measuring device 12 is shown encompassing a component in the form of wing rib 60 to be fit within the cavity 50 of wing 52. The construction of exterior angle measuring device 12 is quite similar to that of angle measuring device 10, however, for ease of understanding of the present invention a description of exterior angle measuring device 12 follows.

The exterior angle measuring device 12 is made up of a support bar or rod 62 made up of two sections 64 and 66, one of which being insertable within the other for adjustable mounting therebetween. More specifically, section 64 is made of a solid box-like element which is insertable within section 66 in the form of a hollow box-like tubular element. Sections 64 and 66 are fixedly secured together by means of a fastening element 68 which forms part of the tubular element or 66. As a result, sections 64 and 66 may be adjusted to a variety of different lengths in a manner to be described hereinebelow At each end of support bar 62 is an angle measuring assembly 70 and 72, respectively The design of assemblies 70 and 72 are substantially identical in configuration Therefore, for ease of understanding of the present invention only one such assembly 70 will be described in detail Assembly 70 is made up of a fixture 74 which is fixedly secured at the end of section 64. Within fixture 74 is a conventional gimbal mounting arrangement 76 to which is attached by means of a pair of pivotally connected elongated elements 78 and 80 a foot or foot-like plate 82. This foot-like plate 82 upon proper adjustment by means of gimbal arrangement 76 and elements 78 and 80 can matingly engage with the exterior surfaces 83 (and 86) of component or wing rib 60. A locking nut 84 is operably connected to gimbal mounting 76 and a locking nut 88 is attached to the pivotal connection of elements 78 and 80 in order to fixedly secure foot-like plate 82 in its appropriate angular position. As stated hereinabove assembly 72 is substantially identical to assembly 70 and also includes a fixture 74' a 80' conventional gimbal arrangement 76' as well as elements 78' and and foot-like plate 82'. In both instances locking nuts 84, 84' and 88, 88', respectively, are utilized to fixedly secure the gimbal arrangements 76 and 76' and foot-like plates 82 and 82' in their preselected positions. In addition, the exterior angle measuring device 12 of the present invention also includes a centering device 90 which is of a T-shaped configuration having an elongated centrally outstanding element 92 situated substantially centrally of a base 94. Within base 94 are a pair of slots 96 and 98 through which securing nuts 100 and 102 can be inserted so as to adjustably mount and secure centering device 90 upon section 64 of support bar 62.

As illustrated in FIG. 2 of the drawings, exterior angle measuring device 62 encompasses component or wing rib 60 with surface 103 of centering device 90 engaging a surface 105 of upstanding centering element 104 of wing rib 60.

As stated above, the foot-like plates 82 and 82' of device 12 are connected to each end of the support bar 62 by means of the pair of connecting elements 78, 80 and 78', 80', respectively, which are capable of adjustable movement with respect to one another as well as with respect to support bar 62. In this manner, the foot-like plates 82 and 82' are capable of encompassing the exterior angular configured surfaces 83 and 86 of wing rib 60 as illustrated in FIG. 2 of the drawings. Once in position the movable portions of exterior angle measuring device 12 are locked in place.

Consequently by the utilization of both the interior angle measuring device 10 and the exterior angle measuring device 12 it is now possible to have an exact duplicate of the interior angular configuration of a cavity 50 by means of device 10 and a duplicate of the exterior angles of a component, such as wing rib 60, to be inserted within cavity 50.

MODE OF OPERATION

Reference is now made to FIG. 3 of the drawings, wherein both the interior angle measuring device 10 and the exterior angle measuring device 12 are shown in their mating position. In order to determine the exact amount of material to be removed from a wing rib 60 or similar type component, the two devices 10 and 12 are positioned juxtaposed one another with their centering brackets 36 and 90 having their surfaces 57 and 103 in contact with one another as illustrated in FIG. 3. In essence, this is a representation of the component or wing rib 60 being fit within cavity 50 of wing 52. As is clearly seen in FIG. 3 of the drawings when this particular relationship between the interior measuring device 10 and the exterior measuring device 12 is provided then a space formed between foot-like plates 32-82 and 32'-82' and designated by letters A and B, respectively, becomes representative of the amount of material to be removed from the wing rib 60 or similar-type component in order to enable its appropriate fit within cavity 50. The relationship between the centering brackets 36 and 90 is similar to the relationship between their relationship to centering beam 58 and centering element 104, respectively. By appropriately measuring these distances A and B, it is merely necessary to remove such an amount of material from the component or wing rib 60 so that it is now an exact mirror image of the interior angular configuration of cavity 50 into which it is to be fitted. In such a manner, the present invention provides an extremely efficient, effective and accurate way in which to provide precise measurements of a wing rib 60 which is to be fit within cavity 50 of wing 52. There is no need for any computer calculations and the entire procedure takes less than one half hour. It should be further pointed out that the system as well as the devices 10 and 12 are adaptable to a wide variety of interior angular measurements as well as components to be fit therein. Although it is preferred that the present invention be utilized in the fitting of wing ribs within aircraft wings it can be used for any other similar-type application. Although this invention has been described with reference to particular embodiments, it will be understood that this invention is also capable of further and other embodiments within the spirit and scope of the appended claims.

I claim:

1. An interior angle measuring device comprising: an adjustable elongated support bar; means adjustably connected to each end of said support bar for conforming to the interior angles of the sides of a cavity formed within an object in order to determine said angles; means adjustably mounted on said support bar for determining the position of said support bar relative to said sides of said cavity, said position determining means including a T-shaped component having a base and an outstanding element protruding therefrom for engaging a side of a preselected element situated intermediate said sides of said cavity, said base being adjustably mounted on said support bar; and means operably associated with said adjustably support bar, said adjustably angle determining means and said adjustably position determining means for locking said support bar, said angle determining means and position determining means in place.

2. An interior angle measuring device as defined in claim 1 further comprising a gimbal arrangement connected to each end of said support bar, each of said gimbal arrangements adjustably connecting said one end of one of said elements of said angle determining means, respectively, thereto.

3. interior angle measuring device as defined in claim 2 wherein said support bar is made of two sections, said two sections being adjustably mounted with respect to each other.

4. An interior angle measuring device as defined in claim 3 wherein said base of said position determining means being adjustably attached to one of said sections.

5. An interior angle measuring device as defined in claim 4 wherein said locking means comprises individual locking components for said adjustable support bar, said adjustable angle determining means and said position determining means, respectively.

6. An exterior angle measuring device comprising: an adjustable elongated support bar; means adjustably connected to each end of said support bar for conforming to the exterior angles of the sides of an object in order to determine said angles; means adjustably mounted on said support bar for determining the position of said support bar relative to the sides of said object, said position determining means including a T-shaped component having a base and an outstanding element protruding therefrom for engaging a side of a preselected element protruding from said object, said base being adjustably mounted on said support bar; and means operably associated with said adjustable support bar, said adjustable angle determining means, and said adjustable position determining means for locking said support bar, said angle determining means and said position determining means in place.

7. An exterior angle measuring device as defined in claim 6 wherein each of said angle determining means comprises a pair of elements pivotally connected together, an end of one of said pivotally connected elements being adjustably connected to an end of said support bar, and a foot-like plate secured to an end of the other of said pivotally connected elements.

8. An exterior angle measuring device as defined in claim 7 further comprising means for locking said pivotally connected elements in place.

9. An exterior angle measuring device as defined in claim 8 further comprising a gimbal arrangement connected to each end of said support bar, each of said gimbal arrangements adjustably connecting said one end of one of said elements of said angle determining means, respectively, thereto.

10. An exterior angle measuring device as defined in claim 9 wherein said support bar is made of two sections, said two sections being adjustably mounted with respect to each other.

11. An exterior angle measuring device as defined in claim 10 wherein said base of said position determining means being adjustably attached to one of said sections.

12. An exterior angle measuring device as defined in claim 11 wherein said locking means comprises individual locking components for said adjustable support bar, said adjustable angle determining means and said position determining means, respectively.

13. A method of precisely configuring an object, said object having angled exterior sides and an outstanding element intermediate said sides, and said object to be fit within a cavity, said cavity having angled interior sides and a component situated within said cavity intermediate said sides for engaging said outstanding element on said object, said method comprising the steps of:
(1) measuring said angles of said interior sides of said cavity by means of an interior angle measuring device having an adjustable support bar, a pair of adjustable interior angle determining means and adjustable means for engaging a side of said component in order to position said adjustable support bar with respect to said sides of said cavity;
(2) locking said adjustable support bar, said interior angle measuring means and said adjustable positioning means of said interior angle measuring device in place;
(3) measuring said angles of said exterior sides of said object by means of an exterior angle measuring device having an adjustable support bar, a pair of adjustable exterior angle determining means and adjustable means for engaging a side of said outstanding element in order to position said adjustable support bar with respect to said sides of said object;
(4) locking said adjustable support bar, said exterior angle measuring means and said adjustable positioning means of said exterior angle measuring device in place;
(5) encompassing said interior angle measuring device with said exterior angle measuring device such that said positioning means of said interior measuring device and said positioning means of said exterior measuring device are in mating engagement with one another;
(6) determining the amount of space between said exterior angle determining means and said interior angle determining means, said space being indicative of the difference in the angular size of said sides of said object and said cavity into which said object is to be fit; and
(7) altering said angular size of said sides of said object in accordance with the amount of said space; whereby said object is thereby configured to precisely fit within said cavity.

14. The method of precisely configuring an object as defined in claim 13 wherein said step of measuring said angles of said interior sides of said cavity includes the step of sliding said interior angle measuring device into said cavity until said adjustable positioning means engages said side of said component within said cavity.

15. The method of precisely configuring an object as defined in claim 16 wherein said step of measuring said angles of said interior sides of said cavity even further includes adjusting the length of said support bar, said positioning means and said interior angle determining means prior to locking them in place.

16. The method of precisely configuring an object as defined in claim 15 further including the step of sliding said interior angle measuring device out of said cavity after measuring said interior angles of said cavity.

* * * * *